United States Patent
Price et al.

(10) Patent No.: US 7,583,477 B2
(45) Date of Patent: Sep. 1, 2009

(54) MAGNETIC RECORDING HEAD WITH A POINT WRITER POLE

(75) Inventors: James K. Price, Tonka Bay, MN (US); Amin Nurul, Woodbury, MN (US); Alaxender M. Shukh, Savage, MN (US); Feng Wang, Lakeville, MN (US); Martin L. Plumer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 682 days.

(21) Appl. No.: 10/610,008

(22) Filed: Jun. 30, 2003

(65) Prior Publication Data

US 2004/0264062 A1    Dec. 30, 2004

(51) Int. Cl.
    *G11B 5/127*    (2006.01)
(52) U.S. Cl. ..................................... 360/317
(58) Field of Classification Search ............ None
    See application file for complete search history.

(56) References Cited

U.S. PATENT DOCUMENTS

| 6,417,990 | B1 | 7/2002 | Zhou et al. | |
| 6,504,675 | B1 | 1/2003 | Murdock et al. | |
| 6,513,228 | B1 * | 2/2003 | Khizroev et al. | 29/603.14 |
| 6,521,335 | B1 | 2/2003 | Amin et al. | |
| 6,757,141 | B2 * | 6/2004 | Santini et al. | 360/317 |
| 7,002,775 | B2 * | 2/2006 | Hsu et al. | 360/125 |
| 7,133,253 | B1 * | 11/2006 | Seagle et al. | 360/126 |
| 2003/0039064 | A1 | 2/2003 | Khizroev et al. | |
| 2005/0024779 | A1 * | 2/2005 | Le et al. | 360/317 |

* cited by examiner

*Primary Examiner*—Mark Blouin
(74) *Attorney, Agent, or Firm*—Kinney & Lnage P.A.

(57) ABSTRACT

A magnetic recording head having a write pole formed in a point. The narrow width of the write pole can be manufactured using existing equipment, reduces the number of steps required to build the recording head, and results in a recording head that has other advantages. Forming the write pole in a point is done using two masking steps and mill processing. The writer and reader are positioned next to each other so that the second masking step which forms the point of the writer pole also defines the back edge of the stripe.

18 Claims, 16 Drawing Sheets

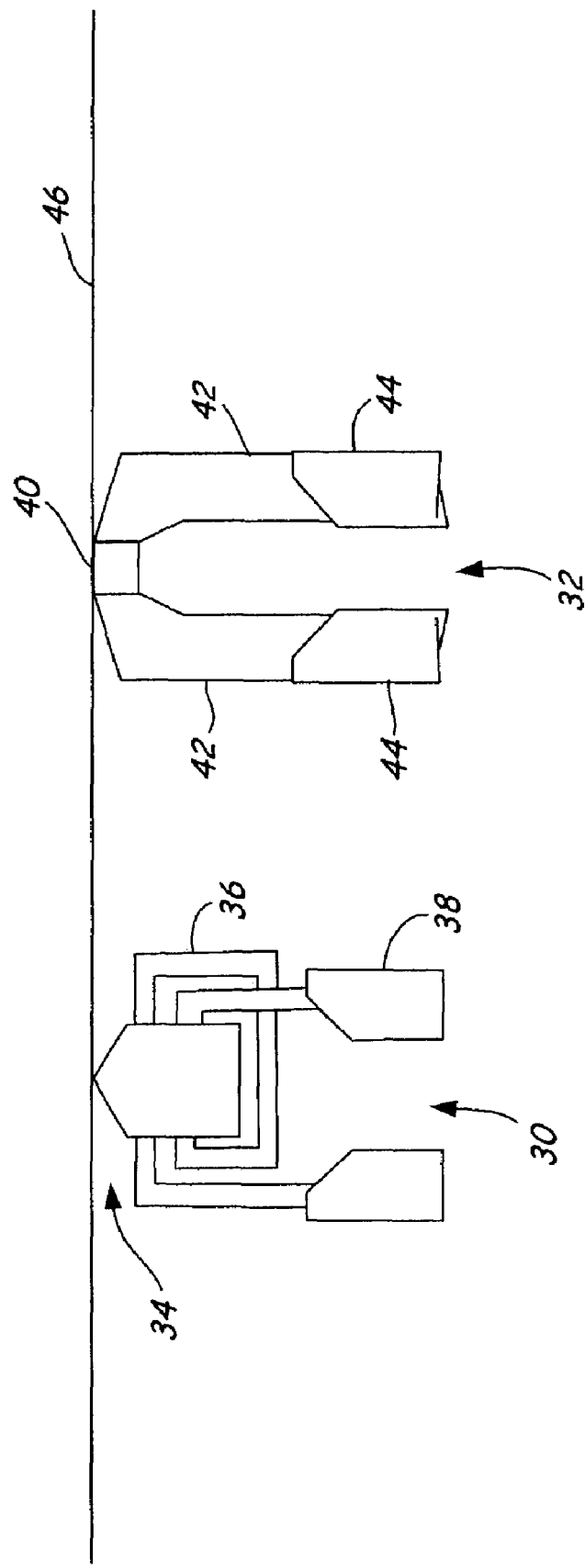

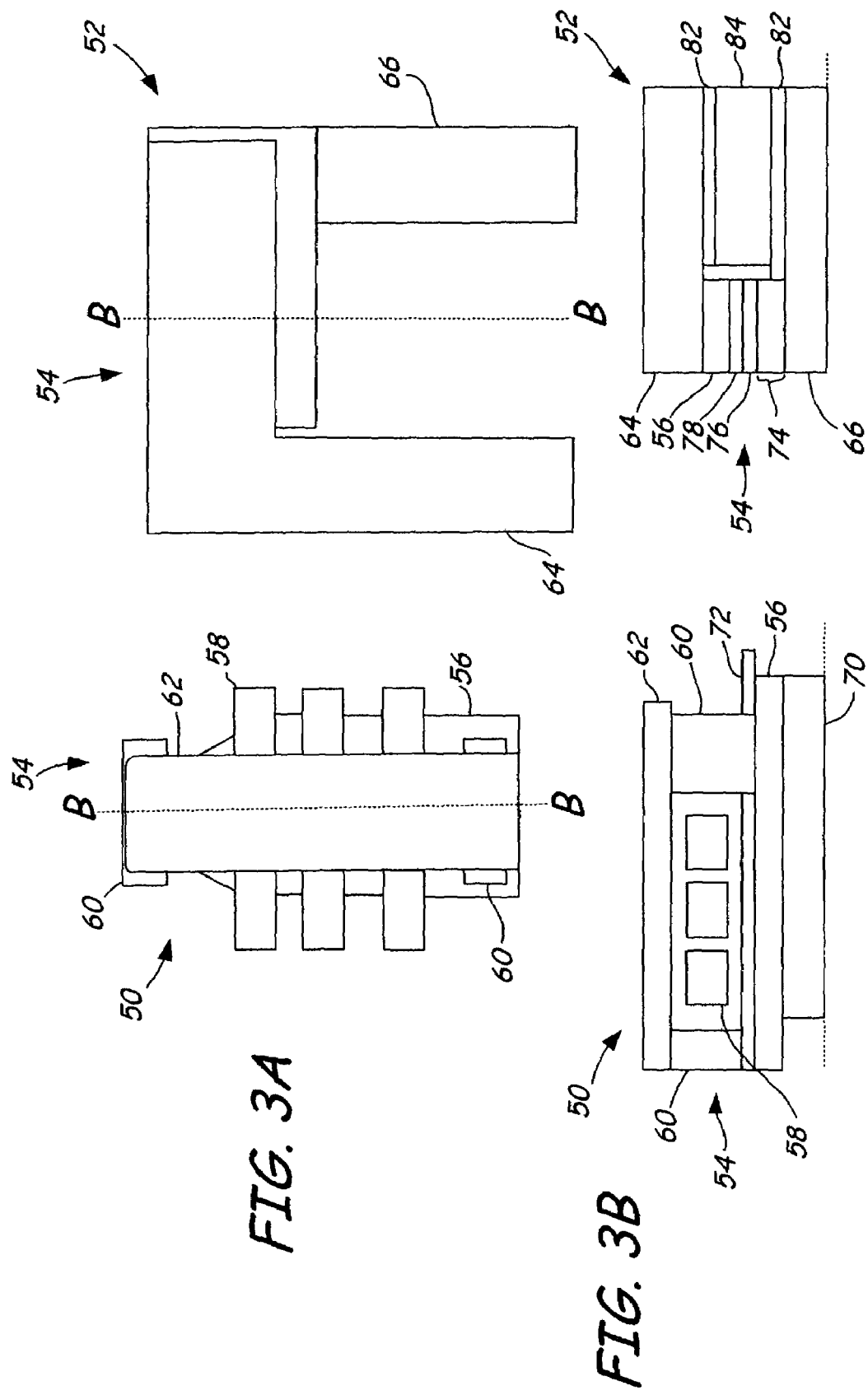

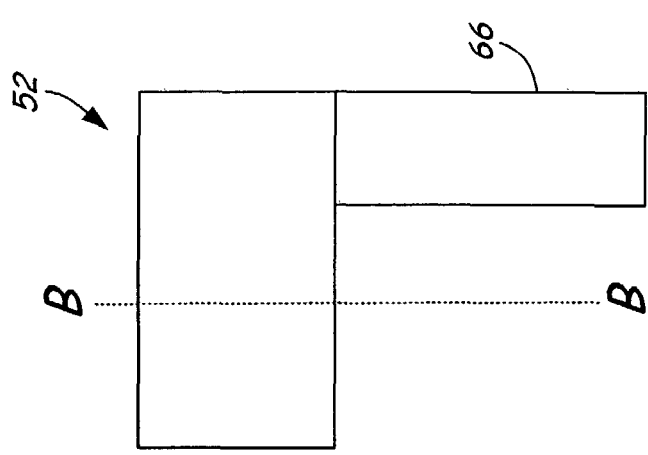
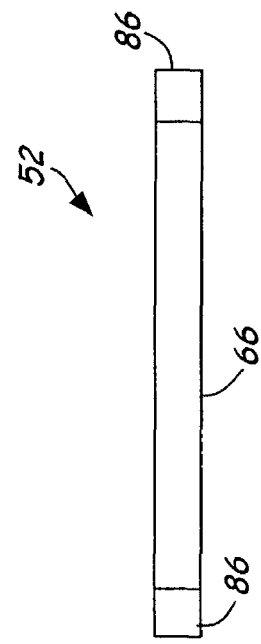
FIG. 4A
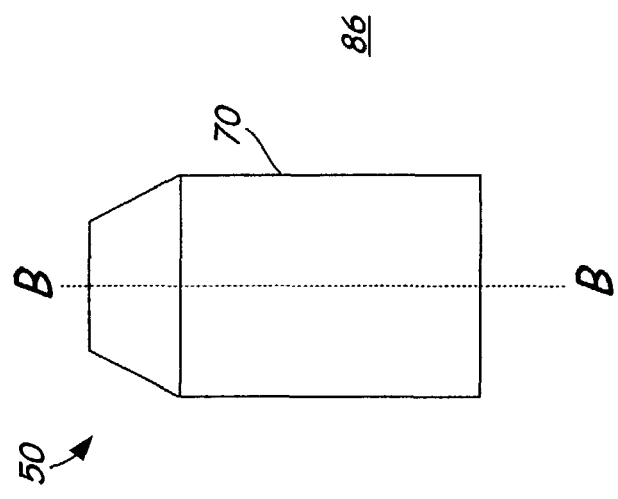
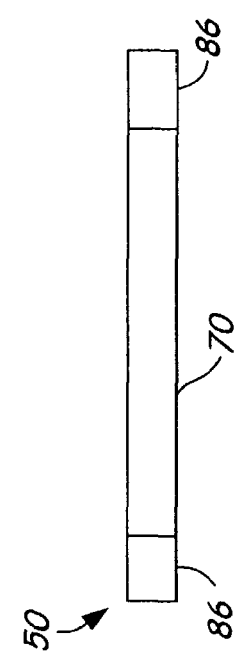
FIG. 4B

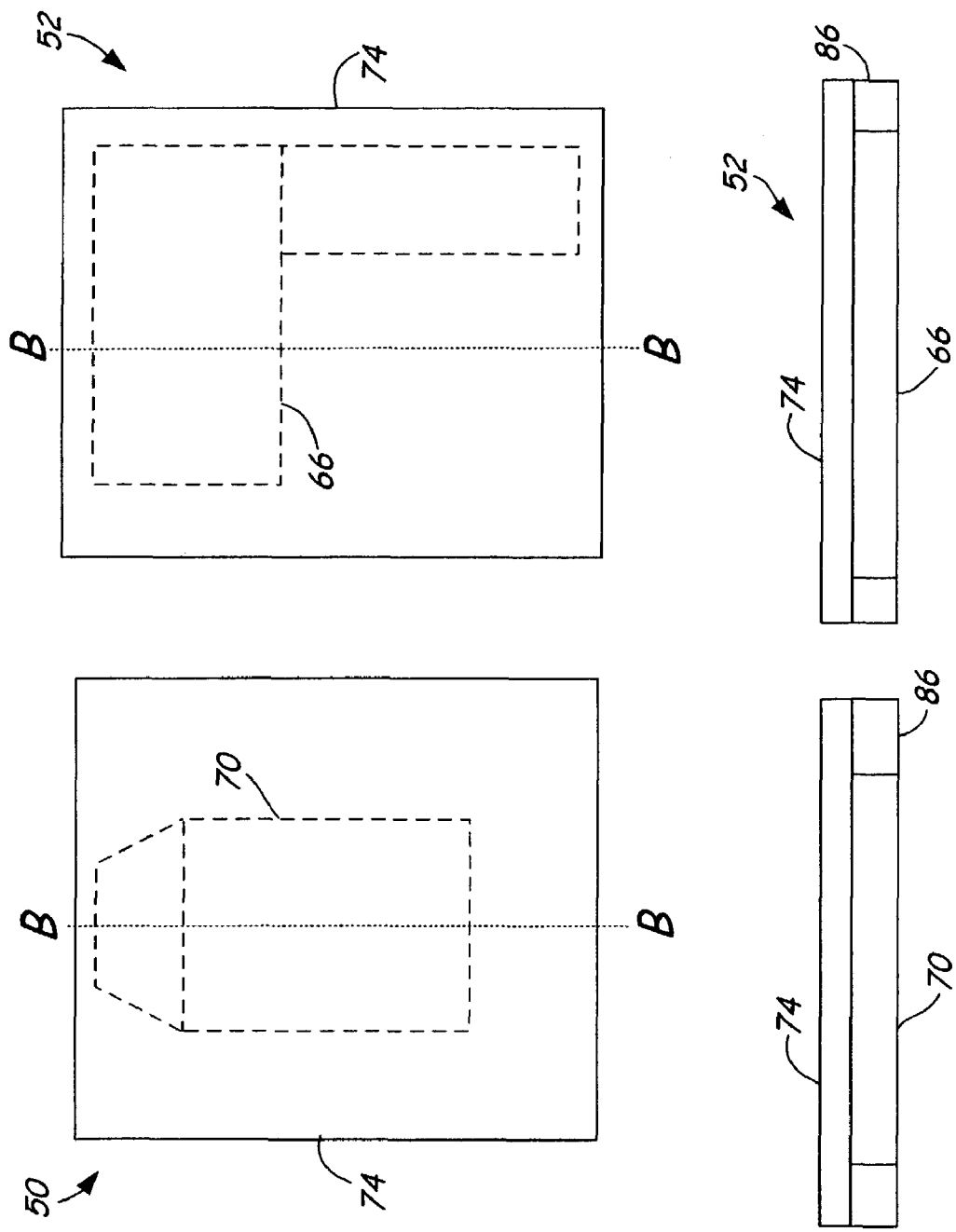

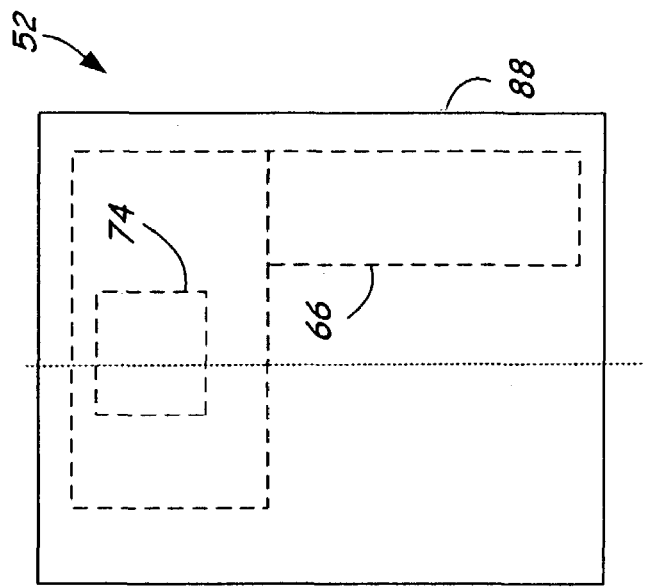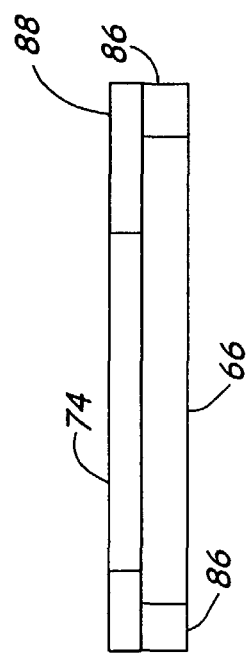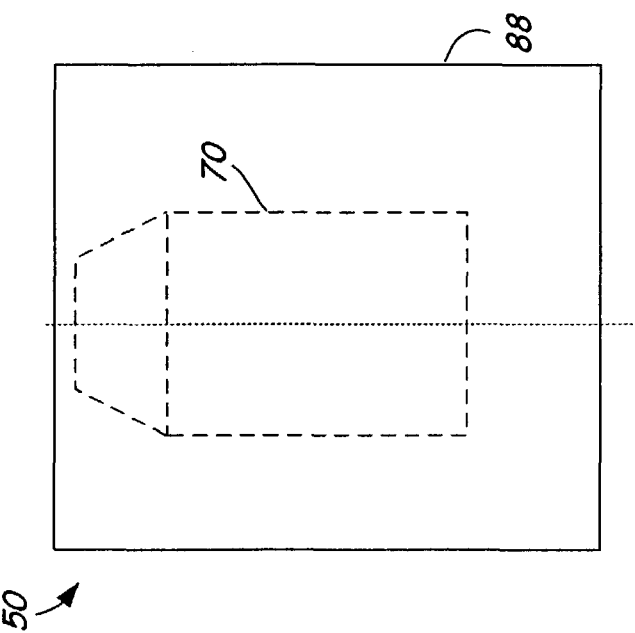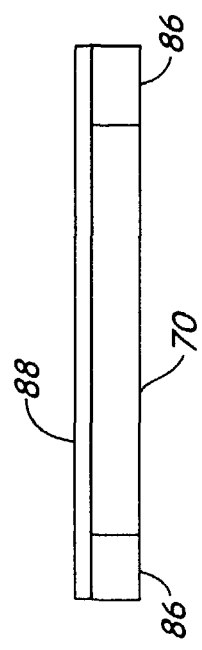
FIG. 6A
FIG. 6B

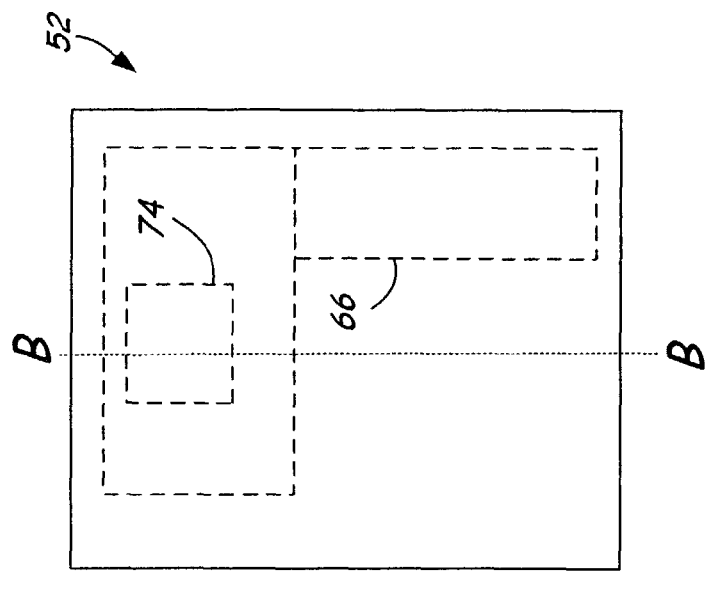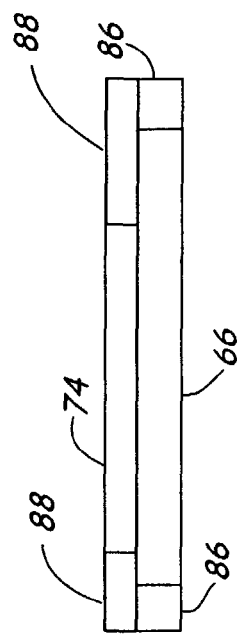
FIG. 7A
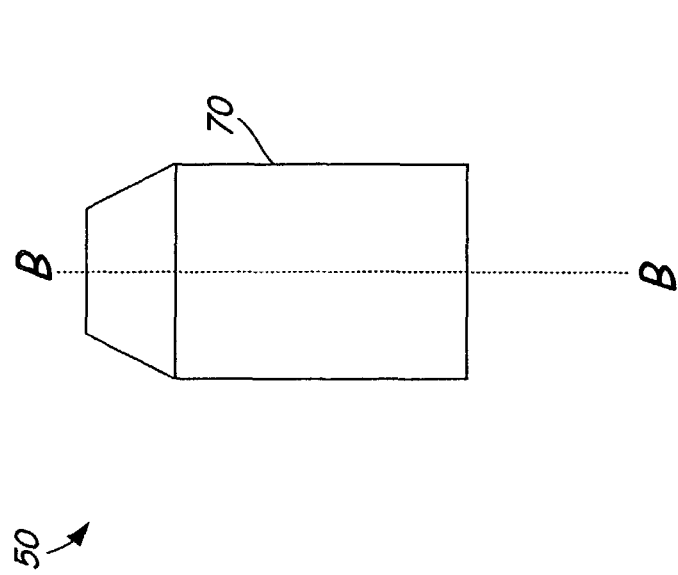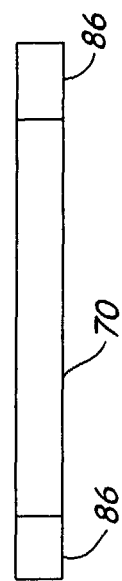
FIG. 7B

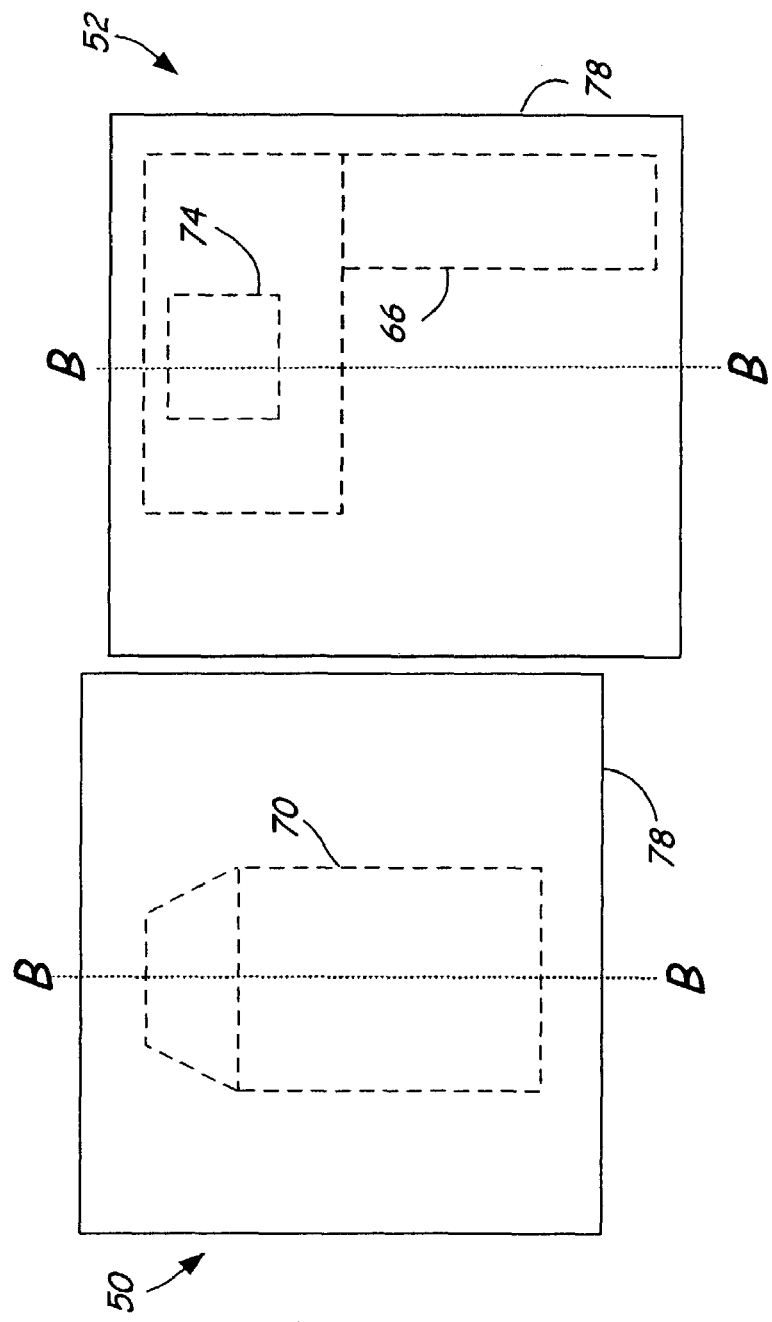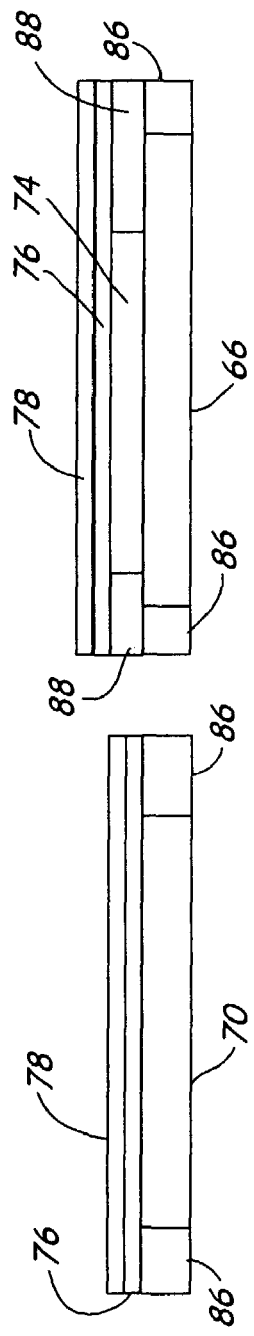
FIG. 8A
FIG. 8B

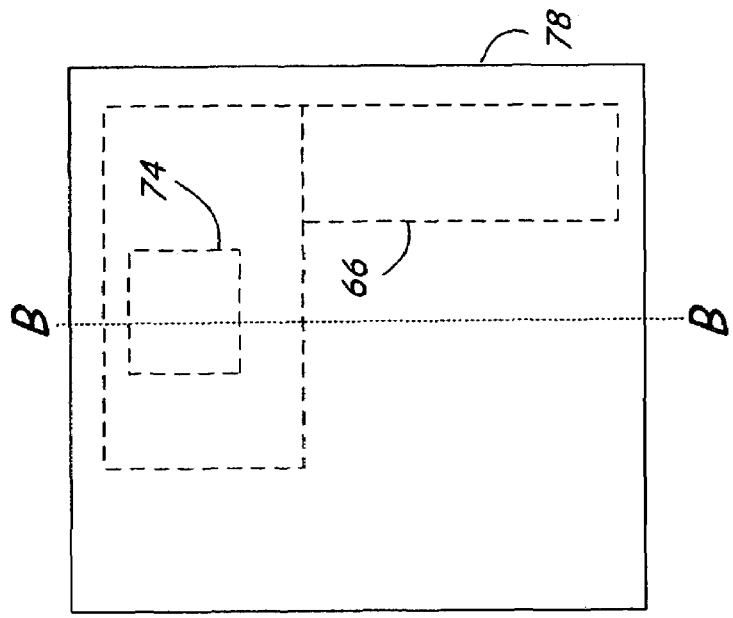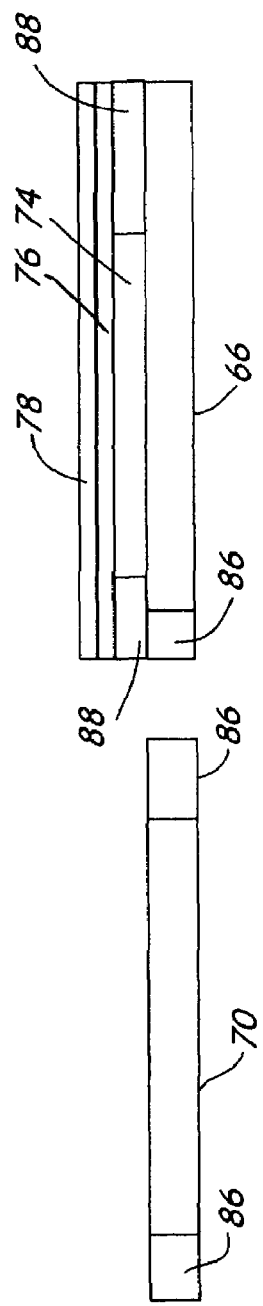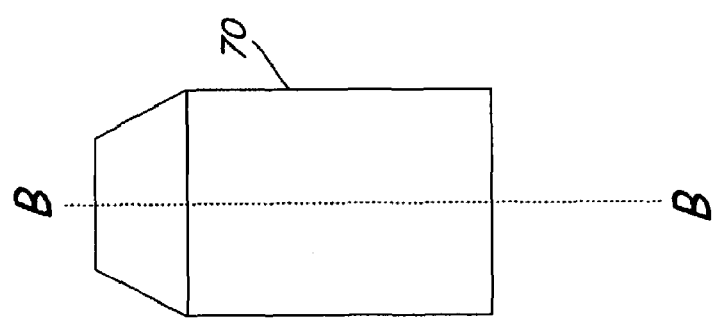
FIG. 9A
FIG. 9B

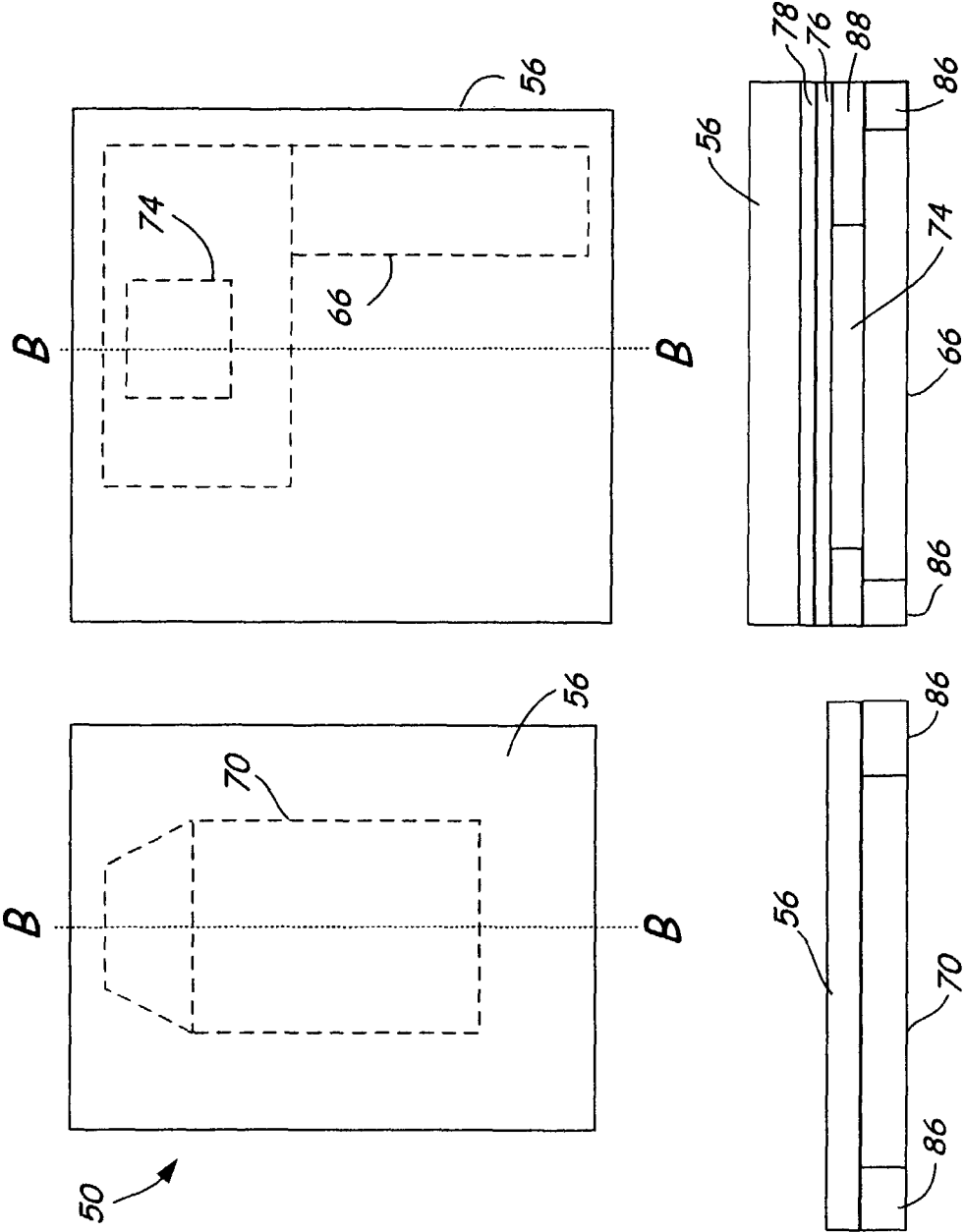

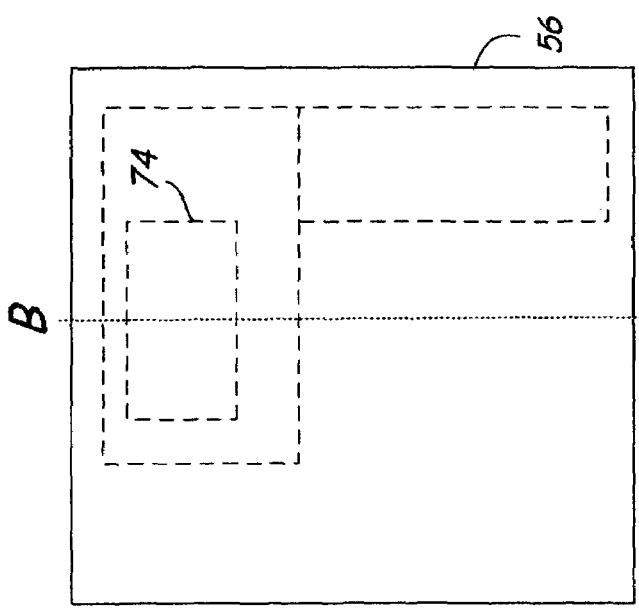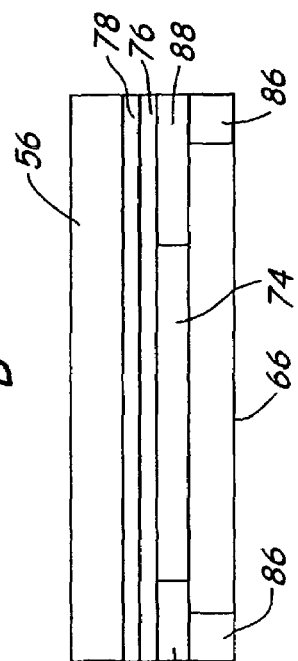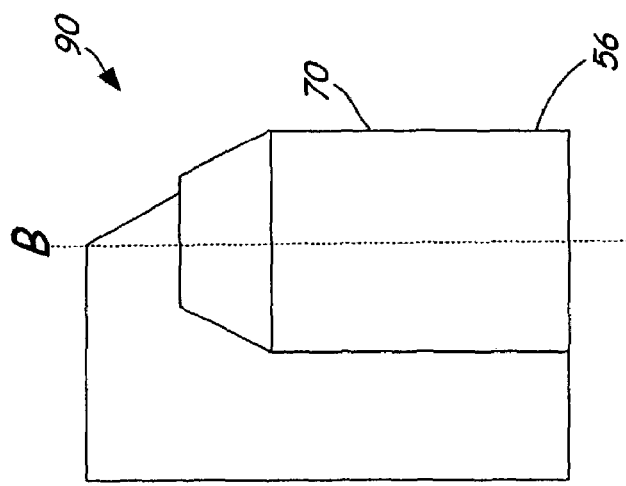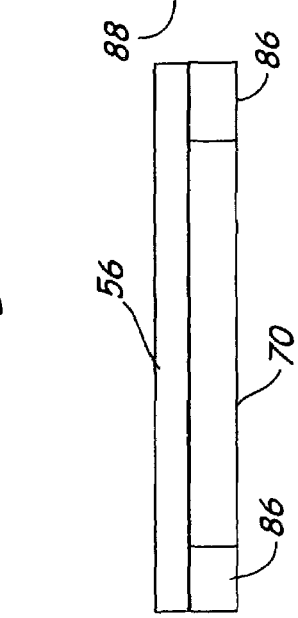
FIG. 11A
FIG. 11B

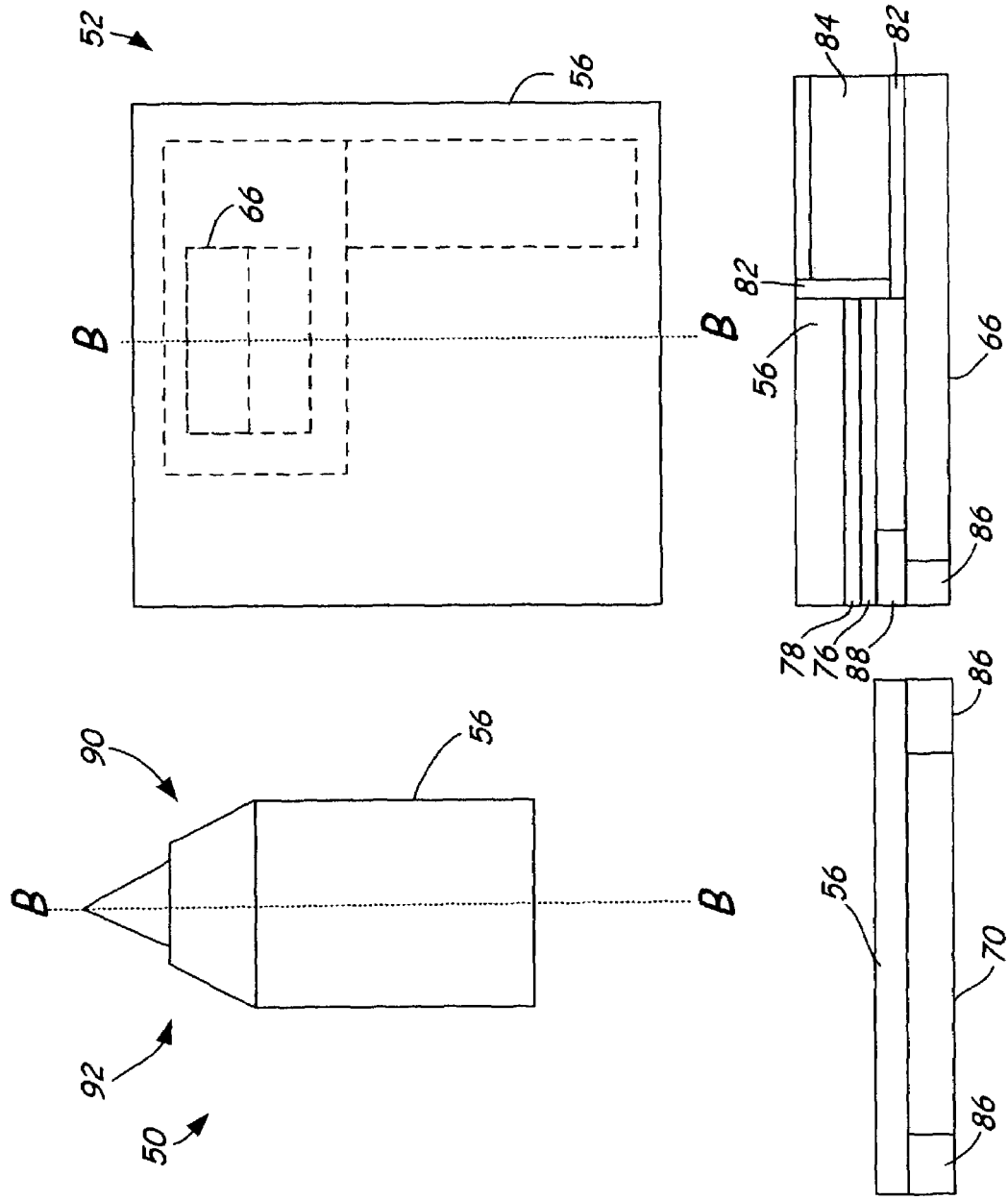

MAGNETIC RECORDING HEAD WITH A POINT WRITER POLE

CROSS-REFERENCE TO RELATED APPLICATION(S)

None.

BACKGROUND OF THE INVENTION

The present invention relates generally to the field of magnetic data storage and retrieval systems. More particularly, the present invention relates to a magnetic recording head with a point writer pole.

A magnetic head for recording generally consists of two portions, a writer portion for storing magnetically-encoded information on a magnetic media (disc) and a reader portion for retrieving that magnetically-encoded information from the media. The reader portion of the magnetic head consists of a bottom shield, a top shield, and a sensor, often composed of a magnetoresistive (MR) material, positioned between the bottom and top shields. Magnetic flux from the surface of the disc (media) causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the data that was encoded on the disc.

The writer portion of the magnetic head typically consists of a main pole and a return pole which are magnetically separated from each other at an air bearing surface (ABS) of the writer by a nonmagnetic gap layer, and which are magnetically connected to each other at a region distal from the ABS by a back gap closure. Positioned at least partially between the main and return poles are one or more layers of conductive coils encapsulated by insulating layers. The ABS is the surface of the magnetic head immediately adjacent to the medium. The writer portion and the reader portion are often arranged in a merged configuration in which a shared pole serves as both the top or bottom shield of the reader portion and the return pole of the writer portion.

To write data to the magnetic medium, an electrical current is caused to flow through the conductive coil, thereby inducing a magnetic field across the write gap between the main and return poles. By reversing the polarity of the current through the coil, the polarity of the data written to the magnetic media is also reversed. Data on double layer perpendicular media are recorded by a trailing edge of the main pole. Accordingly, it is the main pole that defines the track width of the written data. More specifically, the track width is defined by the width of the main pole at the ABS.

In magnetic recording, it is desirable to improve the areal density of information that can be recorded and reliably read. This desire has led to a trend toward shorter bit length along a magnetic recording track and a shrinking track width. Narrow track widths are achieved by use of narrow pole tips at an air bearing surface (ABS) of the head. However, the pole width must be large in the body region of the head where the coil passes between the poles. The larger pole width is necessary to gain adequate magnetic flux through the poles by the coil write current. Hence, it is common to taper the pole from the larger width in the body region to a narrower width in the pole tip region at the ABS. However, forming a write pole having the desired narrow width at the pole tip region has posed many challenges.

Forming the write pole tip has been done by patterning the write pole shape using a photoresist process. However, as the dimensions desired for the write pole tip decrease, the limit has been reached for using a photoresist method. Specifically, the wave length of the light used to develop the photoresist is larger than the pattern to be exposed, making it impossible to develop a photoresist pattern having the desired small dimensions. It is possible to use an x-ray or electron beam machine to address this problem, but such machines are extremely expensive.

In addition, due to the complexity of the magnetic recording head, forming the writer and reader portions on the magnetic head involves several manufacturing processes. Typically, many magnetic recording heads are formed on a wafer structure using a variety of deposition, masking, milling, etching, and/or other similar processing steps. Once the magnetic recording heads are formed, the wafer may be further processed and is sliced into bars and ultimately is separated into individual sliders. This entire process can take a significant amount of time, up to six weeks with the manufacturing process operating twenty four hours a day, seven days a week. Each additional process step required to form the magnetic recording head increases the cost of manufacturing, increases the time needed for forming the magnetic head, and may increase the likelihood of manufacturing errors which affect the final performance of the magnetic head.

Thus, there is a need in the art for a magnetic recording head having a narrow write pole width, as well as a cost effective and time efficient method of manufacturing such a narrow write pole.

BRIEF SUMMARY OF THE INVENTION

The present invention is a magnetic recording head having an improved writer structure. The writer structure is formed with a narrow pole dimension, such as by forming the writer pole into a point at the tip. The method of forming the writer pole having a point uses two masking steps and mill processes to define the top pole width. As such, the point writer structure can easily be manufactured using existing equipment and reduces the number of steps required to build the magnetic recording head.

To further save in process steps, the writer structure is formed beside the reader structure. When doing so, the second masking step used to form the point writer can also be used to define a back edge of the stripe. To allow the pole width to be coupled to the stripe height and lap switch, the writer is positioned next to the reader. In this way, the number of the steps required for forming the recording head is reduced.

BRIEF DESCRIPTION OF THE DRAWINGS

FIG. 2 is a top view of an magnet transducing head having a writer portion formed beside the reader portion.

FIG. 3A is a top view of a writer and a reader portion of a magnetic recording head.

FIG. 3B is a cross sectional view of the writer and reader portions of the magnetic recording head of FIG. 3A taken along lines B-B.

FIGS. 4A-15A are top views of a portion of a writer and a reader illustrating the manufacturing process for forming a point writer.

FIGS. 4B-15B are cross sectional views of the writer and reader portions of the magnetic recording head of FIGS. 4A-15A taken along lines B-B which further serve to illustrate the manufacturing process for forming a point writer.

DETAILED DESCRIPTION

Figure 1:
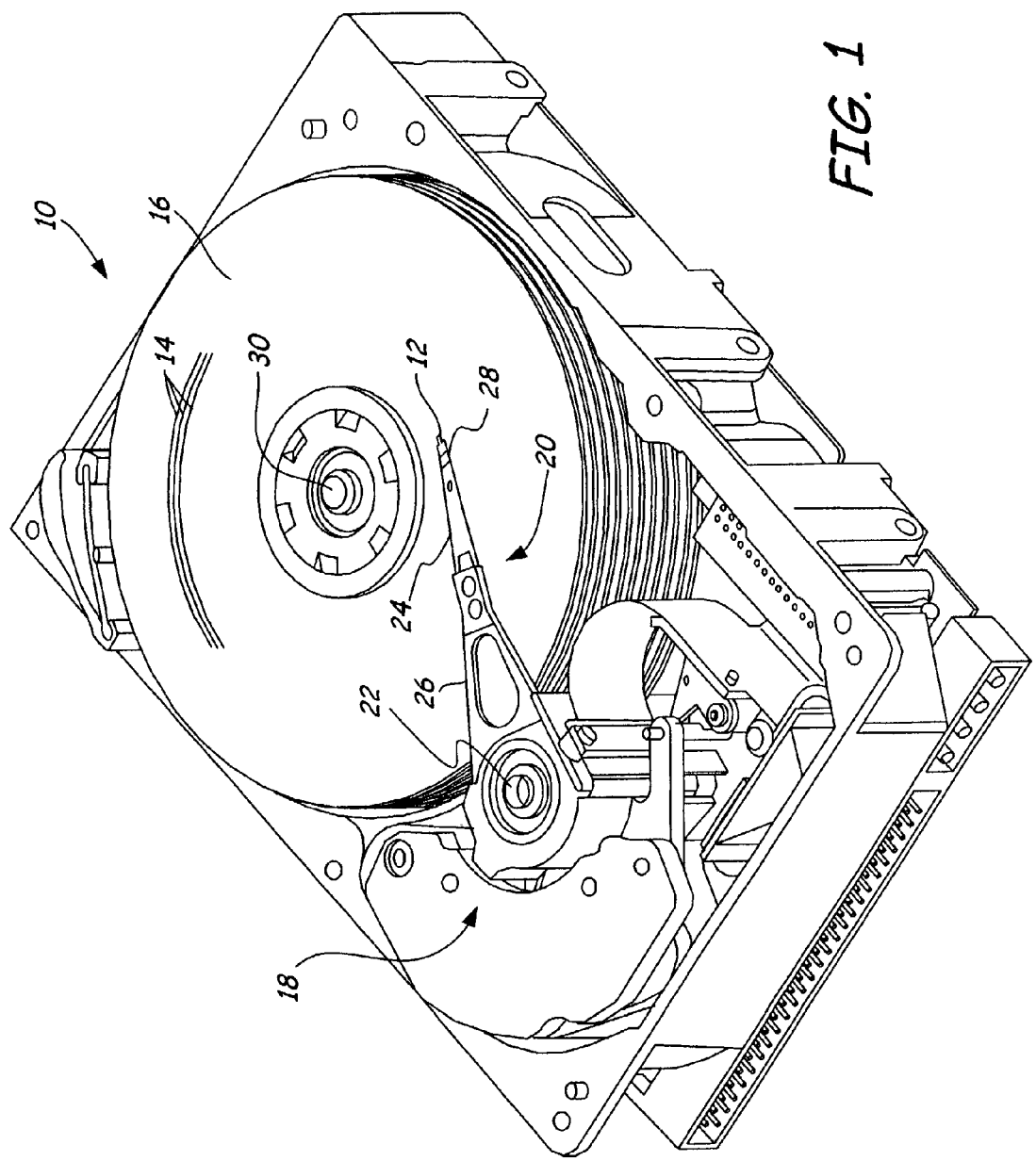
FIG. 1 is a perspective view of a disc drive actuation system for positioning a slider over a track on a disc.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a slider suspension 20 about an axis 22. The slider suspension 20 includes a load beam 24 connected to an actuator arm 26 at a slider mounting block. A flexure 28 is connected to the end of the load beam 24, and carries the slider 12. The slider 12 carries a magnet transducing head (not shown) for reading and/or writing data on the concentric tracks 14 of the disc 16.

The disc 16 rotates around an axis 30, which causes the slider 12 to "fly" a small distance above the surface of the disc 16. To position the slider 12 at a desired track 14 on the disc 16, the VCM 18 actuates the slider suspension 20 about the axis 22 so that the suspension 20 is moved in an arc across the surface of the disc 16. This arc shaped movement allows the slider 12 to be moved from an inner diameter to an outer diameter of the disc 16 so that the slider can be positioned above the desired track 14 on the disc 16.

It is common to form the magnet transducing head carried by the slider in a merged configuration. When doing so, the writer portion and reader portion are stacked so that a shared pole serves as both the top or bottom shield of the reader portion and the return pole of the writer portion. However, it is also possible to form the writer portion beside the reader portion.

FIG. 2 is a top view of an magnet transducing head having a writer portion 30 formed beside a reader portion 32 on a portion of the slider 12. For the sake of simplicity, both the writer 30 and reader 32 portions have been greatly simplified. The writer portion comprises a write pole 34, coil 36, and contacts 38. The reader 32 comprises a reader sensor 40, shields 42, and contacts 44. When formed side by side, the reader 32 and writer 30 portions function similar to when stacked. Specifically, the reader portion 32 reads data from a disc using read sensor 40. The shields 42 help ensure that the sensor 40 will properly read data from a magnetic medium, while the contacts 44 provide a location for electrically connecting external circuitry to the reader portion 32.

To write data to the disc, an electrical current is caused to flow through the coil 36, thereby inducing a magnetic field across a write gap on the writer portion 30. The width of the write pole 34 defines the track width of the written data. More specifically, the track width is defined by the width of the main pole 34 at the ABS 46. Similar to the reader 32, the contacts 38 on the writer 30 provide a location for electrically connecting external circuitry to the writer 30.

Forming the writer portion 30 next to the reader portion 32 as shown in FIG. 2 has several advantages. First off, forming the writer 30 beside the reader 32 can reduce the processing steps involved in making the Magnet transducing head. This is because when the reader portion 32 is being processed, the writer portion 30 can be processed at the same time. Processing both the reader portion 32 and writer portion 30 at the same time can reduce the number of process steps, and thus the amount of time required for fabricating the Magnet transducing head.

In addition, forming the writer portion 30 next to the reader portion 32 can improve the types of shields used in the Magnet transducing head. A common problem with the shields is that they may crack, leading to contamination of the magnetic media. Because there is no longer a shared configuration wherein the write pole is also part of the reader shield, it is possible to use different material to form the reader shield or writer pole based on the desired characteristics for each. Further, it may be possible remove the need for some of the shields in the Magnet transducing head altogether.

Also, as is illustrated and described below, forming the writer portion 30 beside the reader portion 32 allows for forming a write pole in a point. This narrow pole width is desirable because allows for a smaller track width and shorter bit length along a magnetic recording track, which in turn allows for increased areal density.

FIGS. 3A and 3B are more detailed views of a Magnet transducing head having a writer portion formed beside a reader portion. FIG. 3A is a top view of a writer portion 50 and a reader portion 52. Also shown is the location of the ABS 54. The writer portion 50 comprises a write pole 56, a coil 58, a first shield 60, and a second shield 62. Visible as part of the reader portion 52 is a top shield 64 and a lower shield 66.

FIG. 3B is a cross sectional view of the writer portion 50 and the reader portion 52 taken along lines B-B of FIG. 3A. The cross sectional view of FIG. 3B illustrates in more detail the various components of the writer portion 50 and reader portion 52 of the Magnet transducing head. Shown once again in FIG. 3B is the location of the air bearing surface 54 relative to the writer portion 50 and the reader portion 52.

As shown in the cross sectional view, the writer portion 50 comprises the second shield 62, the first shield 60, the coil 58, and the write pole 56. Also shown in the cross sectional view is a yoke 70, which serves to provide additional structure for the write pole 56, and an insulator layer 72. As shown in the cross sectional view, the reader portion 52 comprises the top shield 64 and the lower shield 66. The reader portion 52 further comprises a stack 74, a layer of tantalum 76, a shield 78, and write pole material 56. In addition, the reader portion 52 comprises insulators 82 and stabilizing layer 84. Once again, for ease of description the structure of the writer portion 50 and the reader portion 52 has been simplified.

Each of the structures of the writer portion 50 and reader portion 52 shown in FIG. 3B are formed in a lengthy manufacturing process. This process is illustrated by FIGS. 4A through 16B. To assist in illustrating the manufacturing process, the figures show both a top view (A) and cross sectional view (B) of the Magnet transducing head as the element is being formed. Though illustrated using one writer portion 50 and one reader portion 52, the invention is not so limited and as is often the case, a large number of Magnet transducing heads may be formed at once using a wafer process.

Shown in FIG. 4A are top views of the writer portion 50 and the reader portion 52 being formed on a standard substrate 86. FIG. 4B illustrates a cross sectional view of the writer portion 50 and reader portion 52 taken along lines B-B. The process for forming the writer portion 50 begins by forming the yoke 70 on the substrate 86. The process for forming the reader 52 begins with forming the lower shield 66 on the substrate 86. The yoke 70 and shield 66 are typically formed using a masking and plating process known in the art. As such, it is possible to plate the lower shield 66 and yoke 70 together if the same material is used or separately if different materials are used. Next, though not shown, an insulator may be deposited, such as alumina ($Al_2O_3$), and the surface of the wafer is planarized using any suitable process, such as a chemical mechanical polish.

FIG. 5A shows top views of the writer portion 50 and the reader portion 52 and FIG. 5B shows a cross sectional views taken along lines B-B illustrating the next step in the process of forming a point writer. Shown in FIGS. 5A and 5B is the step of depositing the stack 74. The stack 74 refers to the complex structure of the reader sensor. The stack 74 may be any suitable structure of a reader stack, and is typically formed through several processing steps known in the art. For ease of manufacturing, the stack 74 may be deposited on the writer portion 50 as well as the reader portion 52, though the stack 74 will eventually be removed from the writer portion 50.

FIG. 6A shows top views of the writer portion 50 and the reader portion 52 and FIG. 6B shows a cross sectional views taken along lines B-B. FIGS. 6A and 6B show the processing step of masking the reader stack 74 to obtain the desired shape. Once masked, the reader stack 74 is ion milled or etched to form the reader sensor 74. Next, an insulator layer 88, such as colliminated oxide, is deposited on the wafer over both the writer portion 50 and the reader portion 52 and a liftoff process is performed.

FIG. 7A shows top views of the writer portion 50 and the reader portion 52 and FIG. 7B shows a cross sectional views taken along lines B-B showing the next step of the process. Next, the reader portion 52 is masked, and the insulator 88 is etched from the yoke 70. FIG. 8A shows top views of the writer portion 50 and the reader portion 52 and FIG. 8B shows a cross sectional views taken along lines B-B illustrating the next step of depositing a layer of tantalum 76, which acts as a spacer, followed by the step of depositing a shield 78. FIG. 9A shows top views of the writer portion 50 and the reader portion 52 and FIG. 9B shows a cross sectional views taken along lines B-B illustrating the step of masking the sensor area of the reader portion 52, and etching the tantalum 76 and shield 78 from everywhere else.

FIGS. 10A-12B illustrate the steps involved in forming the write pole having a point. FIG. 10A shows top views of the writer portion 50 and the reader portion 52 and FIG. 10B shows a cross sectional views taken along lines B-B. FIGS. 10A and 10B illustrate the step of depositing the writer pole material 56 on the wafer. The writer pole material 56 may be deposited using any suitable method, such as plating or sputtering.

FIGS. 11A and 11B illustrate the first masking step of forming the point writer pole. FIG. 11A shows top views of the writer portion 50 and the reader portion 52 and FIG. 11B shows a cross sectional views taken along lines B-B. The writer portion 50 is masked and a milling operation is performed to form a first pole edge 90.

Figures 12A, 12B:
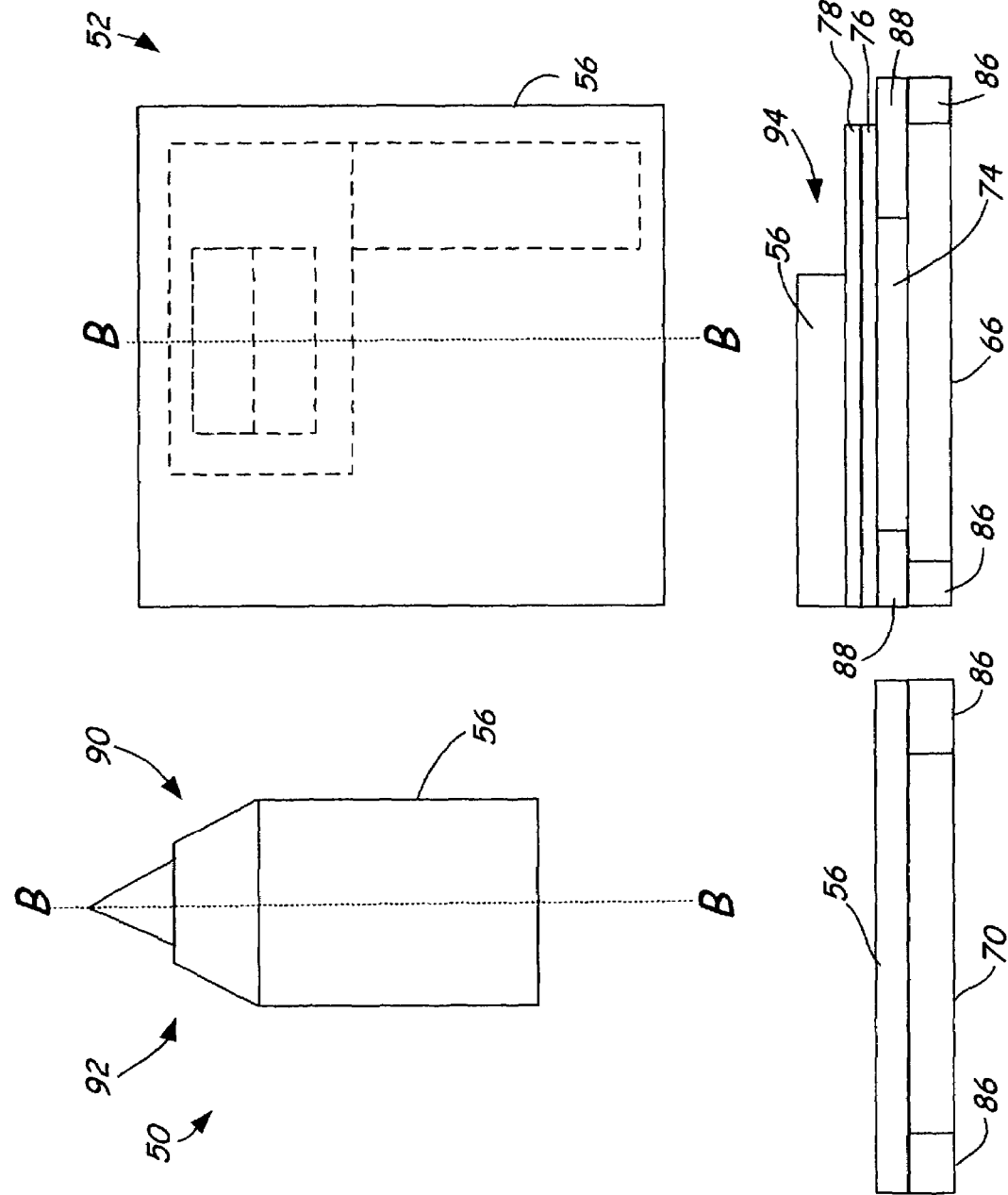

FIGS. 12A and 12B show the next step of forming the point writer pole. FIG. 12A is a top view and FIG. 12B is a cross sectional view of the writer portion 50 and reader portion 52. To form the write pole 56 into the desired shape, a second masking step is performed. The second masking step not only defines the second edge 92 of the writer pole, but also can be used to define the back edge 94 of the reader sensor 74 on the reader portion 52. Once masked, the wafer is milled to form the second write pole edge 92. At the same time, the milling on the reader portion 52 stops in the shield 78 over the reader 74. In this manner, the reader 74 can be milled to the precise dimension desired.

Figures 13A, 13B:
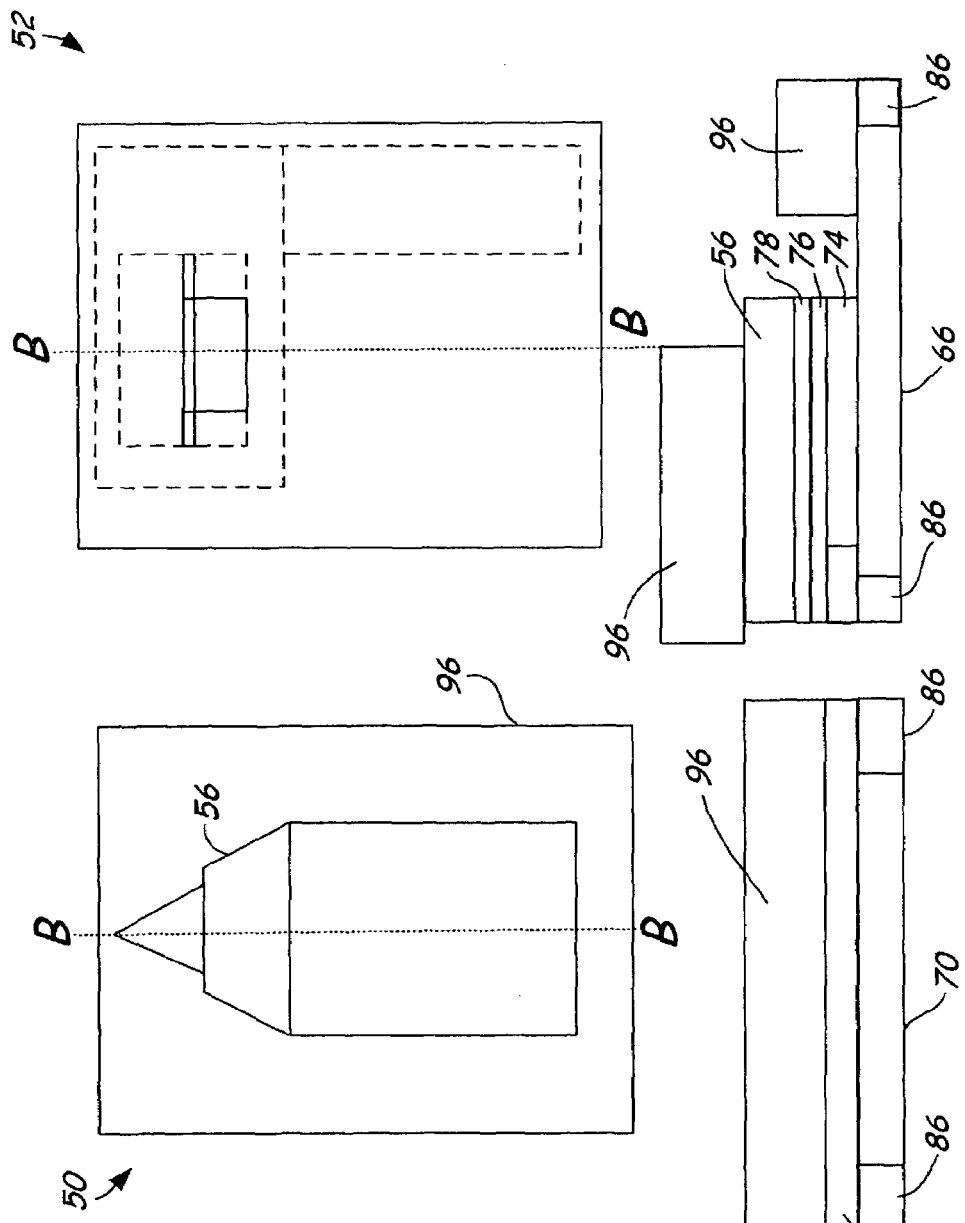

FIGS. 13A-15B illustrate the remaining process steps involved in forming the Magnet transducing head. FIG. 13A is a top view and FIG. 13B is a cross sectional view of the writer portion 50 and reader portion 52. FIGS. 13A and 13B illustrate the step of applying a mask 96 the writer portion 50 and reader portion 52. The mask 96 is to allow the back edge of the reader sensor 74 to be milled without affecting the writer portion 50.

FIG. 14A is a top view and FIG. 14B is a cross sectional view of the writer portion 50 and reader portion 52. FIGS. 14A and 14B illustrate the step of depositing an insulator 82 on the reader portion 52, then depositing a stabilizer 66. Though shown in FIG. 14A as being deposited behind the reader sensor 74, the stabilizer 66 may be formed either on the sides of the sensor 74 or behind the sensor 74. The final step illustrated by FIGS. 14A and 14B is a lift off step, which results in removing material from the writer portion 50 so that only teh write pole 56 and yoke 70 remain.

Figure 15A:
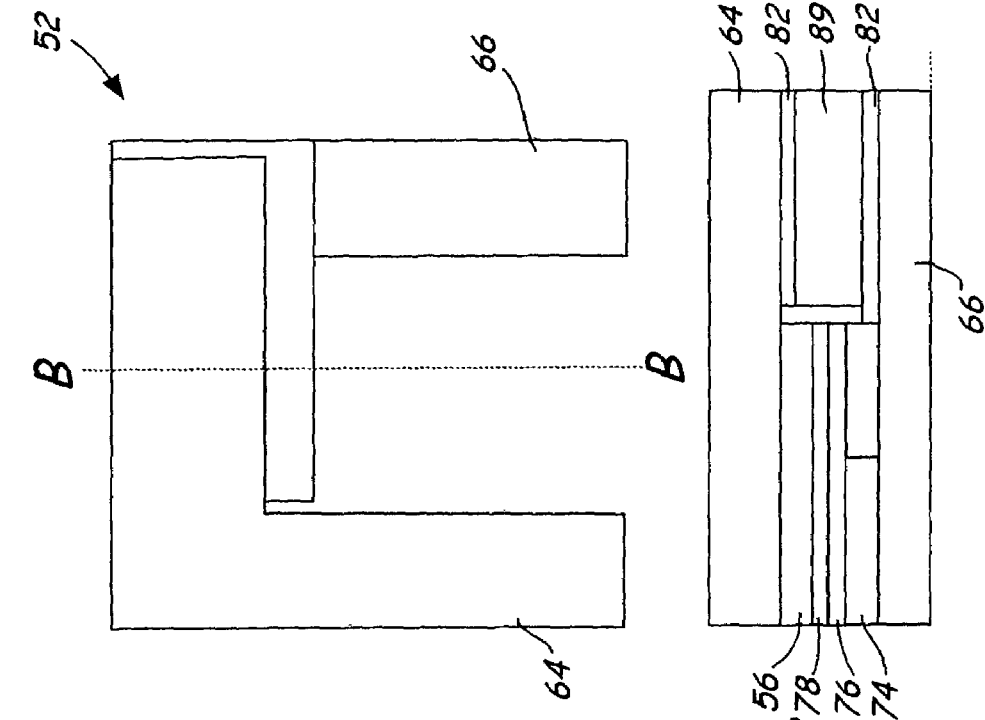
Figure 15B:
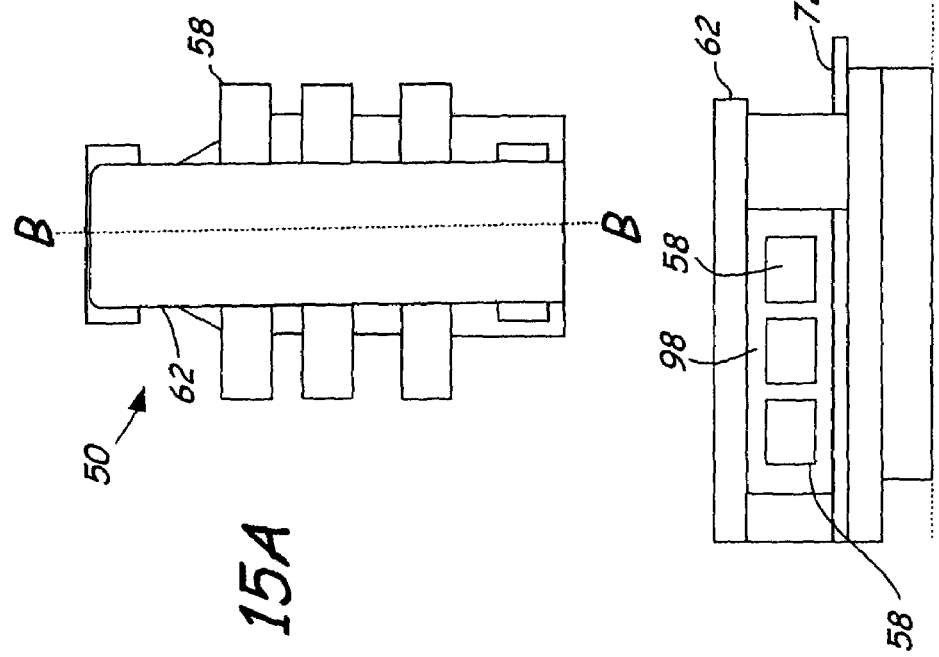

Several of the remaining processing steps used to form the Magnet transducing head are summarized by FIGS. 15A and 15B. FIG. 15A is a top view and FIG. 15B is a cross sectional view of the writer portion 50 and reader portion 52 once the formation process is nearly complete. As shown in FIGS. 15A and 15B, an insulator 72 is deposited on the writer portion 50 using a liftoff process. Next, the first shield 60 is formed on the writer portion 50, such as by using a photoresist process to define the shield structure, application of a seed layer based on the photoresist pattern, platting of the shield material on the seed layer, and removing any remaining photoresist or seed. The shield 64 on the reader portion 52 may be formed at the same time as the first shield 60 on the writer 50, or may be formed afterwards as a separate process.

Next, the coil 58 is formed on the writer portion 50. The coil is formed using any suitable method, including one similar to that described above. For instance, the coil 58 may be formed by depositing a seed layer, masking the seed layer, plating the coil, stripping the masking material, and removing the seed layer, such as by etching. Next, an insulator 98 is deposited on the coil 58, and the writer portion 50 is planarized using any Suitable method, such as a chemical mechanical polish. The final step is to process the second shield 62 on the writer portion 50. This is done using processes known in the art. Once the write portion 50 and the reader portion 52 have been formed, the wafer process continues as required to finish the individual sliders.

The process steps described above with reference to FIGS. 4A through 15B are meant for purposes of illustration. The method used in forming the Magnet transducing head may vary, however the concept of using current equipment to form the writer pole in a point remains novel.

Figure 16:
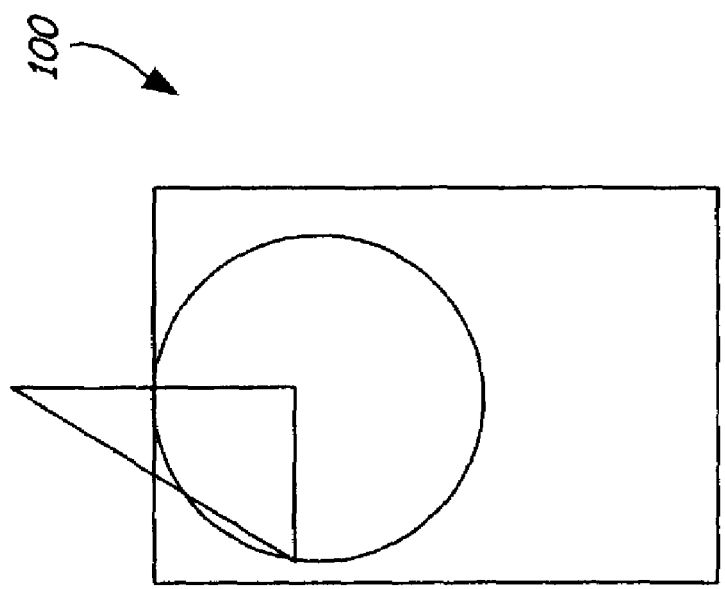
FIG. 16 is atop view of an alternate configuration of a point writer pole.

Though shown as being formed in a point (FIG. 12A), the write pole can be formed in a wide variety of shapes. FIG. 16 is a top view of a writer portion 100 of a Magnet transducing head. The writer portion 100 of FIG. 16 illustrates yet another configuration of a point write pole 100 formed having a slightly different shape. Furthermore, the process described may also allow for forming the write pole in a trapezoidal shape. A trapezoidal write pole is desirable because it reduces problems caused by the skew effect of the Magnet transducing head when writing data to or reading data from data tracks on a circular disc.

Forming the writer pole in a point as illustrated by FIGS. 12A and 16 has many advantages. The point writer pole has no break point, allowing for maximum field at the ABS. Further, it opens up the process window of the pole definition process in that it allows for a mill/resist thickness interaction and eliminates photo CD and overlay variance. In addition, forming the point writer reduces the process content of the Magnet transducing head. There also exists the ability to extend this concept to tera-bit application with future patterned media.

Furthermore, though disclosed in terms of an Magnet transducing head having the writer pole formed beside the reader, the method of forming the write pole in a point can be used in general for all types of sensors. However, in plane sensors are easier to integrate into the process. The point writer concept can be used for either perpendicular or longitudinal writers. The structure of a perpendicular writer is very similar to that of a longitudinal writer, except that the write gap formed at the air bearing surface of a longitudinal writer is much narrower than that of the perpendicular writer. In addition, the media used in connection with a perpendicular writer has a so-called soft under layer, typically a permalloy material.

Similarly, the point writer with reader formed side by side is suitable for vector and trilayer MR elements, and it may be possible to use a similar process for trail MR elements as well, with the advantage of having expensive processing at the back end. Similarly, TGMR is easier.

Forming the writer beside the reader does raise some concerns. In particular, forming the write pole in a point raises the possibility of side writing as a function of pole angle. In addition, forming the writer beside the reader requires large read-write offset. There is also a concern that the back edge of the stripe may be angled. It may likewise be necessary to shield the coil from the reader, depending on read write offset.

Although the present invention has been described with reference to preferred embodiments, workers skilled in the art will recognize that changes may be made in form and detail without departing from the spirit and scope of the invention.

The invention claimed is:

1. A magnetic transducing head comprising:
    a reader for reading data back from a magnetic medium; and
    a writer for writing data to a magnetic medium, separated from the reader in a distinct side-by-side and substantially coplanar configuration, such that the writer and reader are not in contact, the writer comprising a yoke and a write pole at least partially overlying the yoke, the write pole having a write pole tip that extends beyond the yoke, the write pole tip having first and second pole edges that converge as they extend beyond the yoke, such that the write pole has essentially no break point.

2. The magnetic transducing head of claim 1 wherein the reader comprises a lower shield formed of a same material as the yoke.

3. The magnetic transducing head of claim 1 wherein the writer comprises a longitudinal writer.

4. The magnetic transducing head of claim 1 wherein the writer comprises a perpendicular writer.

5. The magnetic transducing head of claim 1, wherein the writer comprises a first shield and the reader comprises a top shield formed of a same material as the first shield.

6. A transducer comprising:
    a substrate;
    a reader proximate the substrate for reading data back from a magnetic medium; and
    a writer proximate the substrate and separated from the reader in a distinct side-by-side and substantially coplanar configuration, such that the writer and reader are not in contact, wherein the writer comprises a yoke and a write pole, the write pole having a pointed write pole tip that extends beyond the yoke to the air bearing surface, the write pole tip having first and second pole edges that converge as they approach the air bearing surface, such that the write pole has essentially no break point.

7. The transducer of claim 6 wherein the writer comprises a longitudinal writer.

8. The transducer of claim 6 wherein the writer comprises a perpendicular writer.

9. The transducer of claim 6, wherein the reader comprises a lower shield formed of a same material as the yoke.

10. A method of forming a magnetic transducing head having a small write pole dimension, the method comprising:
    forming a read sensor;
    forming a yoke separated from the read sensor in a distinct side-by-side and substantially coplanar configuration, such that the yoke and the read sensor are not in contact;
    depositing a write pole material at least partially over and extending beyond the yoke;
    forming a first write pole edge in the write pole material that extends beyond the yoke;
    applying a mask to define a second write pole edge in the write pole material and a back edge of the read sensor; and
    forming the back edge of the read sensor and the second write pole edge in the write pole material such that the second write pole edge extends beyond the yoke and the first and second write pole edges converge to create a pointed write pole having essentially no break point, the pointed write pole having a pointed write pole tip that extends beyond the yoke.

11. The method of claim 10 wherein forming the first write pole edge comprises applying a first mask to define the first write pole edge and milling the write pole material based on the first masked edge.

12. The method of claim 10 wherein forming the second write pole edge comprises milling the write pole material and the read sensor based on the masked edge.

13. The method of claim 12 and further comprising forming a lower shield for the read sensor by depositing the lower shield and the yoke together, of a same material.

14. The method of claim 13 and further comprising milling a reader stack of the read sensor when milling the second write pole edge, to obtain a desired reader structure size.

15. The method of claim 10, further comprising forming a read shield layer and a write shield layer by depositing the read shield layer and the write shield layer at the same time, of a same material.

16. A method of forming a transducer having a small pole dimension, the method comprising:
    forming a reader;
    forming a yoke separated from the reader in a distinct side-by-side and substantially coplanar configuration, such that the yoke and the reader are not in contact;
    depositing a write pole material at least partially over and extending beyond the yoke;
    masking a first write pole edge on the write pole material extending beyond the yoke;
    milling the write pole material to form the first write pole edge;
    masking the reader and the write pole material extending beyond the yoke;
    milling the write pole material and the reader to form a second write pole edge and a back edge of the reader, wherein the first write pole edge and the second write pole edge converge to form a pointed write pole having essentially no break point, the pointed write pole having a pointed write pole tip extending beyond the yoke.

17. The method of claim 16 wherein milling the reader comprises milling a read sensor to a desired read sensor dimension.

18. The method of claim 16, wherein forming the yoke comprises depositing the yoke together with a lower reader shield.

* * * * *

UNITED STATES PATENT AND TRADEMARK OFFICE
CERTIFICATE OF CORRECTION

PATENT NO. : 7,583,477 B2
APPLICATION NO. : 10/610008
DATED : September 1, 2009
INVENTOR(S) : Price et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Fourteenth Day of September, 2010

David J. Kappos
*Director of the United States Patent and Trademark Office*